(12) United States Patent
Frikha et al.

(10) Patent No.: US 11,841,891 B2
(45) Date of Patent: Dec. 12, 2023

(54) MAPPING WEBPAGES TO PAGE GROUPS

(71) Applicant: Content Square SAS, Paris (FR)

(72) Inventors: Slim Frikha, Paris (FR); Michael Snellman, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/877,691

(22) Filed: Jul. 29, 2022

(65) Prior Publication Data

US 2023/0350933 A1   Nov. 2, 2023

Related U.S. Application Data

(60) Provisional application No. 63/336,780, filed on Apr. 29, 2022.

(51) Int. Cl.
*G06F 16/35* (2019.01)
*G06F 16/955* (2019.01)
*G06F 16/33* (2019.01)

(52) U.S. Cl.
CPC .......... *G06F 16/35* (2019.01); *G06F 16/3334* (2019.01); *G06F 16/955* (2019.01)

(58) Field of Classification Search
CPC ..... G06F 16/35; G06F 16/3334; G06F 16/955
See application file for complete search history.

(56) References Cited

U.S. PATENT DOCUMENTS

| | | | |
|---|---|---|---|
| 2008/0010292 A1 | 1/2008 | Poola | |
| 2008/0114800 A1* | 5/2008 | Gazen | G06F 16/355 |
| 2009/0049062 A1 | 2/2009 | Chitrapura et al. | |
| 2014/0365475 A1* | 12/2014 | Bhandari | G06F 16/31 |
| | | | 707/723 |
| 2020/0159925 A1* | 5/2020 | Parlak | G06F 21/566 |
| 2020/0380254 A1* | 12/2020 | Zeng | G06V 30/40 |
| 2020/0387583 A1* | 12/2020 | Drey | G06Q 20/3829 |
| 2022/0171749 A1* | 6/2022 | Le Huerou | G06F 16/215 |

OTHER PUBLICATIONS

"International Application Serial No. PCT/IB2023/054395, International Search Report dated Sep. 8, 2023", 4 pgs.
"International Application Serial No. PCT/IB2023/054395, Written Opinion dated Sep. 8, 2023", 8 pgs.
Anonymous, "Cluster analysis", Wikipedia, [Online]. Retrieved from the Internet: < https://en.Wikipedia.org/w/index.php?title=Cluster_analysis&oldid=576544197>, (May 10, 2013), 23 pgs.

* cited by examiner

*Primary Examiner* — Richard L Bowen
*Assistant Examiner* — Aryan D Toughiry
(74) *Attorney, Agent, or Firm* — Schwegman Lundberg Woessner, P.A.

(57) ABSTRACT

Aspects of the present disclosure involve a system comprising a computer-readable storage medium storing a program and method for mapping webpages to page groups. The program and method provide for receiving plural Uniform Resource Locators (URLs), each URL of the plural URLs corresponding to a respective webpage of a website; generating a distance matrix with pairwise distances between the plural URLs; performing hierarchical clustering based on the distance matrix, to generate a dendrogram in which the plural URLs are arranged in hierarchical clusters; and determining, based on the dendrogram, a predicted page group for each of the plural URLs.

17 Claims, 8 Drawing Sheets

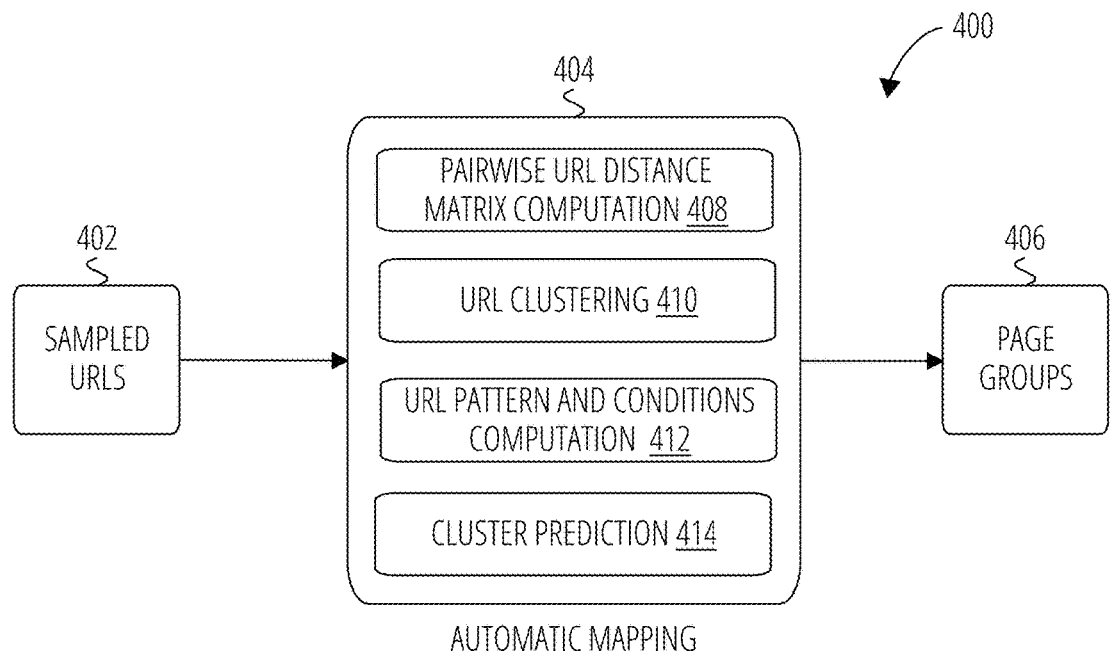
FIG. 4
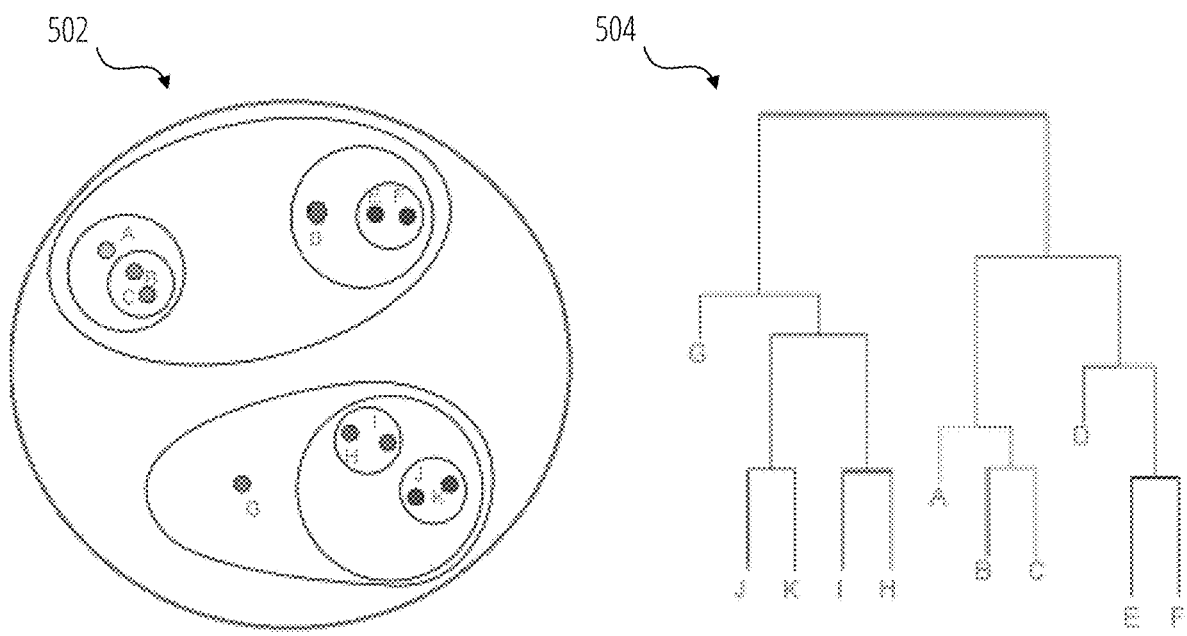
FIG. 5A                FIG. 5B

MAPPING WEBPAGES TO PAGE GROUPS

CLAIM OF PRIORITY

This Application claims the benefit of priority of U.S. Provisional Application No. 63/336,780, filed Apr. 29, 2022, which is hereby incorporated by reference in its entirety.

TECHNICAL FIELD

The present disclosure relates generally to web session analysis, including mapping webpages to page groups.

BACKGROUND

Web analysis solutions provide for the collection and analysis of website data. Such solutions may provide for capturing user interaction with respect to webpage visits.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 4 illustrates an architecture configured to map webpages to page groups, in accordance with some examples.

FIGS. 5A and 5B illustrate example dendrograms in which URLs are grouped into clusters, in accordance with some examples.

DETAILED DESCRIPTION

Web analysis solutions provide for the collection and analysis of website data. Example web analysis tools include the tracking and recording of session events corresponding to user interactions, automated website zone identification, session replay, statistical analysis of collected data, and the like. Such tools may require that a website be configured, for example, with respect to properly mapping the pages of the website to page groups.

The disclosed embodiments provide for automatically creating mappings of webpages to page groups, with qualitative conditions. The experience analytics system as described herein provides for creating page groups (e.g., meaningful page groups), and estimating conditions that build each page group.

In one or more embodiments, the disclosed embodiments provide for receiving plural Uniform Resource Locators (URLs), each URL of the plural URLs corresponding to a respective webpage of a website, and generating a distance matrix with pairwise distances between the plural URLs. Hierarchical clustering is performed based on the distance matrix, to generate a dendrogram in which the plural URLs are arranged in hierarchical clusters. Based on the dendrogram, a predicted page group is determined for each of the plural URLs.

Networked Computing Environment

Figure 1:
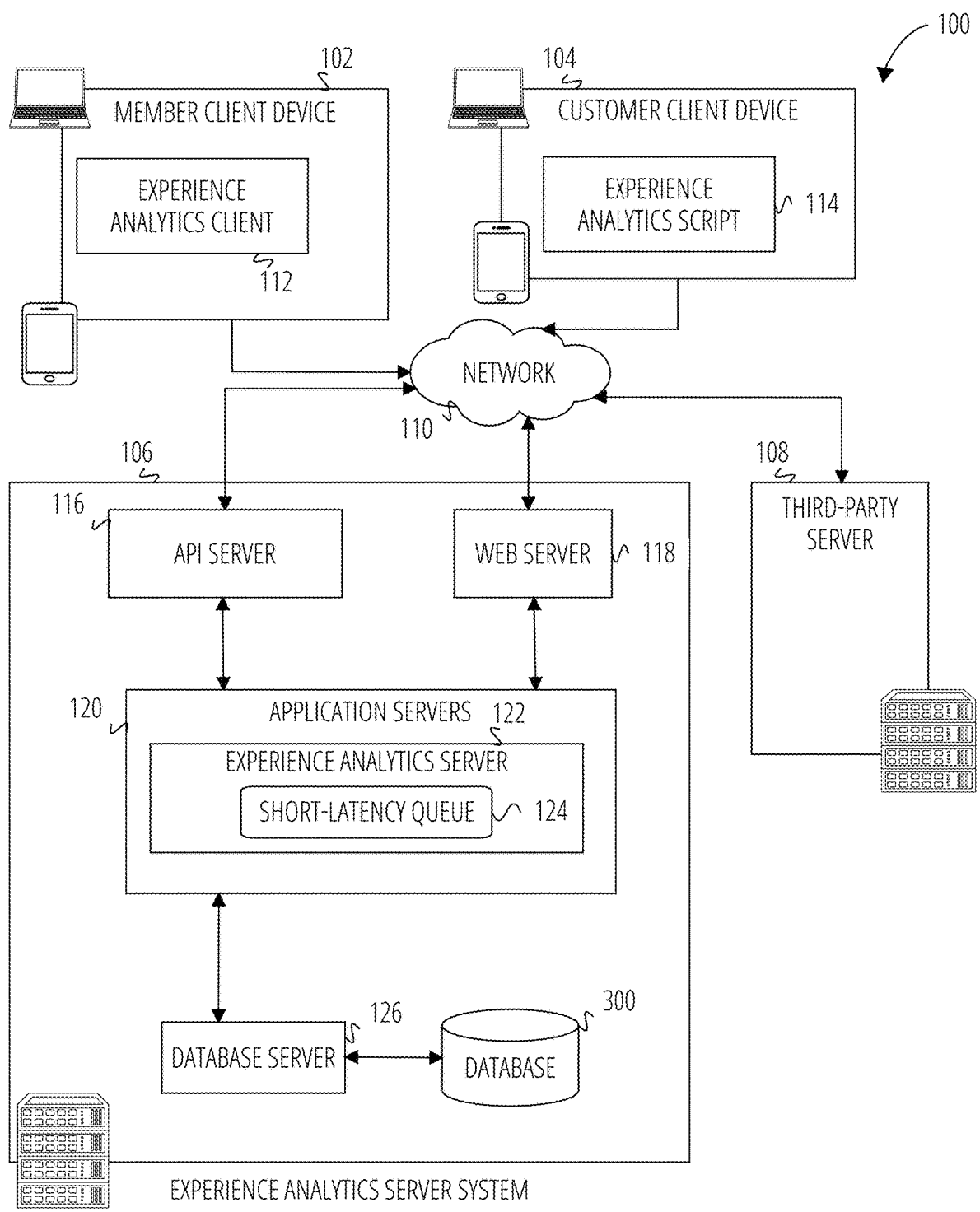
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 104, and multiple instances of a third-party server 108.

The member client device 102 is associated with a client of the experience analytics system 100, where the client that has a website hosted on the client's third-party server 108. An agent of the client (e.g., a web administrator, an employee, an operator, etc.) can be the user of the member client device 102.

Each of the member client devices 102 hosts a number of applications, including an experience analytics client 112. Each experience analytics client 112 is communicatively coupled with an experience analytics server system 106 and third-party servers 108 via a network 110 (e.g., the Internet). An experience analytics client 112 can also communicate with locally-hosted applications using Applications Program Interfaces (APIs).

The member client devices 102 and the customer client devices 104 can also host a number of applications including Internet browsing applications (e.g., Chrome, Safari, etc.). The experience analytics client 112 can also be implemented as a platform that is accessed by the member client device 102 via an Internet browsing application or implemented as an extension on the Internet browsing application.

Users of the customer client device 104 can access client's websites that are hosted on the third-party servers 108 via the network 110 using the Internet browsing applications. For example, the users of the customer client device 104 can navigate to a client's online retail website to purchase goods or services from the website.

The third-party server 108 may include data relating to websites, data relating to webpages, other, like, data, and any combination thereof. The third-party server 108 may be a local web source(s), remote web source(s), or any combination thereof, including a cloud-based network(s), distributed network(s), and the like. Examples of the third-party server 108 include, but are not limited to, repositories of webpage information, repositories of webpage element or zone information, servers configured to provide "live" webpages, other, like, sources, and any combination thereof.

While a user of the customer client device 104 is navigating a client's website on an Internet browsing application, the Internet browsing application on the customer client device 104 can also execute a client-side script (e.g., JavaScript (.*js)) such as an experience analytics script 114. In one example, the experience analytics script 114 is hosted on the third-party server 108 with the client's website and processed by the Internet browsing application on the customer client device 104. The experience analytics script 114 can incorporate a scripting language (e.g., a .*js file or a .json file).

In certain examples, a client's native application (e.g., ANDROID™ or IOS™ Application) is downloaded on the customer client device 104. In this example, the client's native application including the experience analytics script 114 is programmed in JavaScript leveraging a Software Development Kit (SDK) provided by the experience analytics server system 106. The SDK includes Application Programming Interfaces (APIs) with functions that can be called or invoked by the client's native application.

In one or more embodiments, the experience analytics script 114 is configured to collect activity relating to a client's interaction with the third-party server 108 content through a webpage displayed on the customer client device 104. In one example, the experience analytics script 114 records data including the changes in the interface of the webpage being displayed on the customer client device 104, the elements on the webpage being displayed or visible on the interface of the customer client device 104, the text inputs by the user into the webpage, a movement of a mouse (or touchpad or touch screen) cursor, user scrolls, and mouse (or touchpad or touch screen) clicks on the interface of the webpage. In addition, and with proper user permissions, the experience analytics script 114 may be configured to collect activity data features including, customer client device 104 type, website/application type, customer client device 104 geolocation, customer client device 104 internet protocol (IP) address, uniform resource locators (URLs) accessed by the customer client device 104, customer client device 104 screen resolution, and/or referrer URLs.

The experience analytics script 114 transmits the data to the experience analytics server system 106 via the network 110. In another example, the experience analytics script 114 transmits the data to the third-party server 108 and the data can be transmitted from the third-party server 108 to the experience analytics server system 106 via the network 110. As such, the experience analytics script 114 is configured to collect activity relating to a client's interaction with web server content (e.g., content from the third-party server 108) through a webpage displayed on the customer client device 104.

In one or more embodiments, the experience analytics script 114 may be included within the source code of a webpage, such as the hypertext markup language (HTML) code underlying such a webpage, where such source code is hosted by the third-party server 108 (e.g., web server). Where a user of the customer client device 104 connects to the third-party server 108 and requests to visit a given webpage, the underlying code for the webpage is downloaded to the customer client device 104 and rendered thereupon, including the experience analytics script 114, providing for user interaction with the webpage, as well as for data collection by the experience analytics script 114.

In one or more embodiments, the member client device 102 includes an experience analytics client 112. The experience analytics client 112 is a platform, program, service, or the like, configured to provide help agents, and the like, with the ability to view details of a live session. For example, the experience analytics client 112 is configured to provide user interfaces to display one or more features of a live session, including, without limitation, live session events, historical replay data, and the like, as well as any combination thereof. The experience analytics client 112 may be configured to provide a help agent with a unique per-session view, the unique per-session view corresponding to a single user's current session. The experience analytics client 112 may be configured to provide the unique view upon the help agent's activation of a unique link (e.g., a live session link), where such a unique link may be sent to the member client device 102 upon a user's interaction with a "live support" or similar button or feature, as may be included in a webpage which a user is visiting on the customer client device 104.

The experience analytics client 112 may be further configured to identify, based on the contents of the unique link, one or more relevant live replay data features including, without limitation, live session events, historical recorded events, and the like, and to collect, receive, or otherwise access such data features. Specifically, the experience analytics client 112 may be configured to access live session events by opening a connection to a short-latency queue (SLQ) 124.

In addition, the experience analytics client 112 may be configured to collect or receive data relevant to one or more previous sessions including, as examples and without limitation, session replays, session replay analytics, and the like. The experience analytics client 112 may be configured to provide for collection, receipt, or the like, of such data, as may be relevant to such previous sessions, from one or more sources including, without limitation, the database 300, and the like, as well as any combination thereof.

Following collection, receipt, or the like, of live and historical session data, the experience analytics client 112 provides for displaying user interface(s) with one or more of such data features to a help agent, providing for agent review of current and historical session data. Such presentation, through the member client device 102, provides for short-term view of session data combined with long-term persistent view of session data. In this regard, data exchanged between the experience analytics client 112 and the experience analytics server system 106 may include functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 106 supports various services and operations that are provided to the experience analytics client 112. Such operations include transmitting data to and receiving data from the experience analytics client 112. Data exchanges to and from the experience analytics server system 106 are invoked and controlled through functions available via user interfaces (UIs) of the experience analytics client 112.

The experience analytics server system 106 provides server-side functionality via the network 110 to a particular experience analytics client 112. While certain functions of the experience analytics system 100 are described herein as being performed by either an experience analytics client 112 or by the experience analytics server system 106, the location of certain functionality either within the experience analytics client 112 or the experience analytics server system 106 may be a design choice. For example, it may be technically preferable to initially deploy certain technology and functionality within the experience analytics server system 106 but to later migrate this technology and functionality to the experience analytics client 112 where a member client device 102 has sufficient processing capacity.

Turning now specifically to the experience analytics server system 106, an Application Program Interface (API) server 116 is coupled to, and provides a programmatic interface to, application servers 120. The application servers 120 are communicatively coupled to a database server 126, which facilitates access to a database 300 that stores data associated with experience analytics processed by the application servers 120. Similarly, a web server 118 is coupled to the application servers 120, and provides web-based interfaces to the application servers 120. To this end, the web server 118 processes incoming network requests over the Hypertext Transfer Protocol (HTTP) and several other related protocols.

The Application Program Interface (API) server 116 receives and transmits message data (e.g., commands and message payloads) between the member client device 102 and the application servers 120. Specifically, the Application Program Interface (API) server 116 provides a set of interfaces (e.g., routines and protocols) that can be called or queried by the experience analytics client 112 or the experience analytics script 114 in order to invoke functionality of the application servers 120. The Application Program Interface (API) server 116 exposes to the experience analytics client 112 various functions supported by the application servers 120, including generating information on errors, insights, merchandising information, adaptability information, images, graphs providing visualizations of experience analytics, session replay videos, zoning and overlays to be applied on the website, etc.

The application servers 120 host a number of server applications and subsystems, including for example an experience analytics server 122. The experience analytics server 122 implements a number of data processing technologies and functions, particularly related to the aggregation and other processing of data including the changes in the interface of the website being displayed on the customer client device 104, the elements on the website being displayed or visible on the interface of the customer client device 104, the text inputs by the user into the website, a movement of a mouse (or touchpad) cursor and mouse (or touchpad) clicks on the interface of the website, etc. received from multiple instances of the experience analytics script 114 on customer client devices 104. The experience analytics server 122 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 122, in view of the hardware requirements for such processing.

In one or more embodiments, the experience analytics server 122 is configured to execute instructions for streaming live sessions (e.g., live browsing sessions). As is relevant to the execution of instructions for streaming live sessions, live sessions are real-time or near-real-time representations of user journeys through a webpage or set of webpages, including the users' interactions therewith.

The experience analytics server 122 may be configured to activate a "live mode" or other, similar, program, routine, or the like, in response to the receipt, collection, or the like, of one or more "live mode" trigger commands, instructions, or the like, as may be sent by the experience analytics script 114, as described above. Such "live mode" routines may include, without limitation, increasing session event processing frequency, initiating one or more post-to-SLQ processes, such as may be applicable to the population of the short-latency queue (SLQ) 118 with live replay events and data, and the like.

The SLQ 124 may provide for collection, receipt, or the like, of session events, including session events in the order of collection or receipt. The SLQ 124 is a memory, storage, or other, like, component, configured to provide real-time or near-real-time storage of session events, such as clicks, scrolls, text entries, and the like, in the order in which such session events are generated during a user's session, as well as subsequent retrieval or transmission of such stored events, including in order, in real-time or near-real-time, as described hereinbelow. The SLQ 124 may be configured as a virtual component, as a physical component, or in a hybrid physical-virtual configuration.

In one or more embodiments, the database 300 is configured to archive data permanently or semi-permanently. The database 300 may be configured to store information received from one or more web third-party servers 108 (e.g., based on a request from the experience analytics server 122 to the third-party servers 108 for information, such as webpage content), customer client devices 104, and other, like, components, as well as to store data relevant to the operation of the experience analytics server 122 and any outputs therefrom. The database 300 may be a local system, a remote system, or a hybrid remote-local system. Further, the database 300 may be configured as a fully-physical system, including exclusively physical components, as a virtualized system, including virtualized components, or as a hybrid physical-virtual system. Examples of devices which may be configured as a database 300 in the experience analytics system 100 include, without limitation, local database hardware, cloud storage systems, remote storage servers, other, like, devices, and any combination thereof. Further, the database 300 may be directly connected to the experience analytics server 122, such as without an intermediate connection to the network 110, including via connections similar or identical to those described with respect to the network 110.

In one or more embodiments, the database 300 may be configured to store or otherwise archive data relating to one or more sessions, including, without limitation, user interactions, user sessions, other, like, data, and any combination thereof. Further, the database 300 may be configured to transfer, to and from the experience analytics server 122, data necessary for the execution of the methods described herein, and may store or otherwise archive experience analytics server 122 inputs, experience analytics server 122 outputs, or both.

As an example of a potential use-case involving the experience analytics system 100, as may be relevant to the descriptions provided herein, a user may attempt to access a website to purchase a product. The user may, through the customer client device 104, and a browser app included therein, generate a request to access the website. The request, when received by the third-party server 108, may configure the third-party server 108 to send a copy of webpage(s) of the website to the customer client device 104, including the experience analytics script 114. The database 300 may store a copy of the webpage(s) from the third-party servers 108 (e.g., based on a request from the experience analytics server 122 to the third-party servers 108). The experience analytics server 122 may provide such copy to the customer client device 104. During the course of the customer client's session, the experience analytics script 114 may collect session data and transmit such data to the experience analytics server 122 for storage in the database 300.

In addition, where the user at the customer client device 104 encounters an issue (e.g., an error such a defective checkout button, user confusion, and/or another type of issue), the user may engage a live help support feature (e.g., implemented by the experience analytics server 122), for example, by selecting a chat button. In this regard, the help support feature includes a chat component, which allows a support agent at the member client device 102 to chat with the user at the customer client device 104. Moreover, the help support feature allows the user to connect with the help agent, causing the experience analytics script 114 to employ a script interface (e.g., a Javascript API) to make data available for the member client device 102 (e.g., such that when the live session link/button is pressed, this data is visible to the agent), and to send a live mode trigger to the experience analytics server system 106. Following receipt of the live mode trigger by the experience analytics server system 106, the user's session data may be pushed to the SLQ 124 of the experience analytics server 122, in real-time or near-real-time. The experience analytics server 122 sends the live session link to the member client device 102, where the live session link is selectable by the help agent.

Following a help agent's activation of the live session link, the experience analytics server 122 may be configured to provide live session replay to the member client device 102. For example, the experience analytics server 122 generates a combined SLQ 124 and database 300 data feed, and provides the combined data feed to the help agent at the member client device 102, in real-time or near-real-time, permitting the help agent to view the user's live session, and provide suggestions regarding how the user can better engage with the website. The merging allows the help agent to seek back (e.g., rewind) to view what happened, even before the website visitor at the customer client device 104 pressed the chat button.

System Architecture

Figure 2:
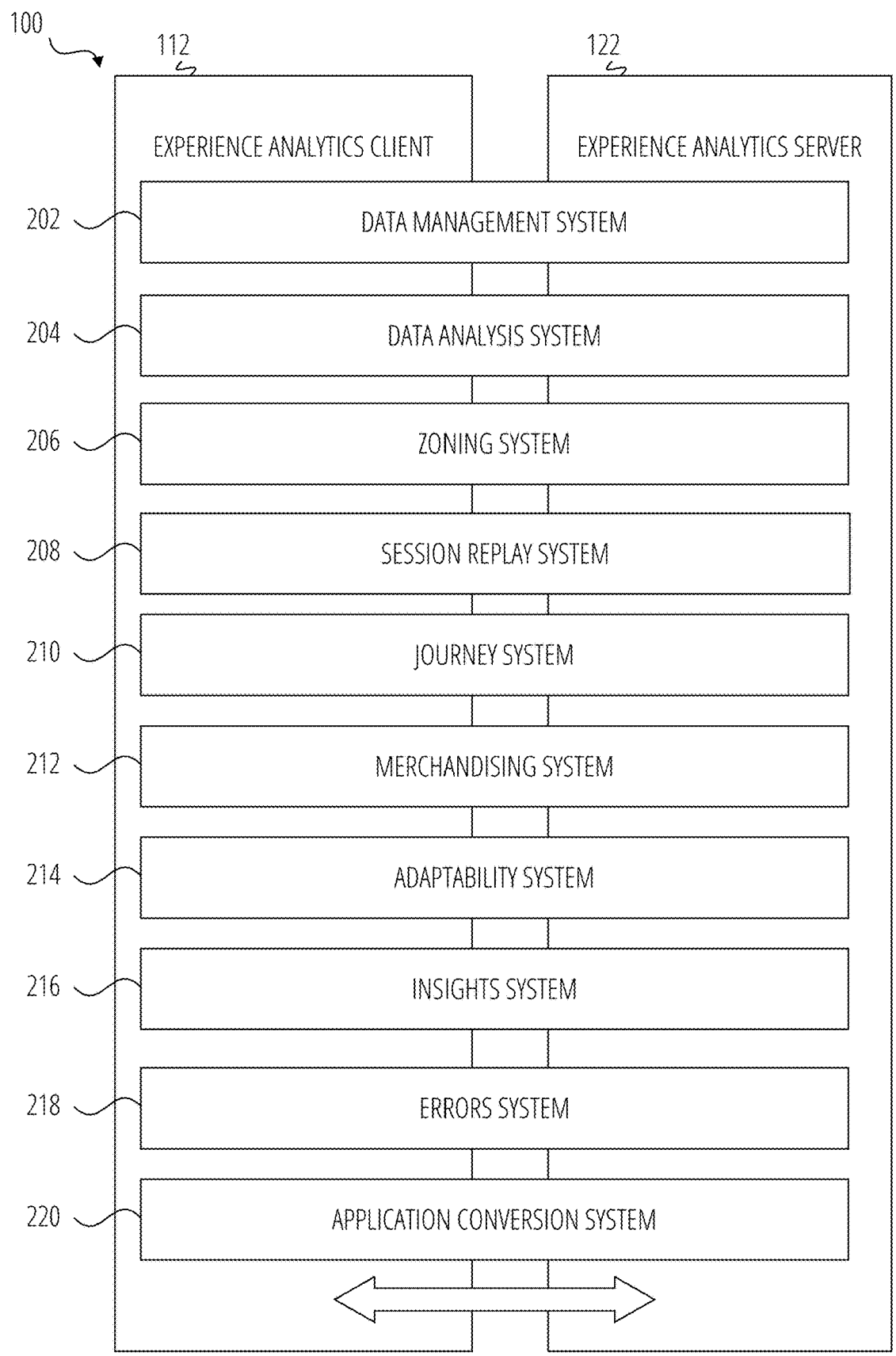
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 112 and the experience analytics server 122. The experience analytics system 100 embodies a number of subsystems, which are supported on the client-side by the experience analytics client 112 and on the server-side by the experience analytics server 122. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the processors 804, the experience analytics script 114 executed by each of the customer client devices 104, and the third-party servers 108. The data management system 202 is also responsible for exporting data to the processors 804 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the processors 804 via the experience analytics client 112. The zoning interface provides a visualization of how the users via the customer client devices 104 interact with each element on the client's website. The zoning interface can also provide an aggregated view of in-page behaviors by the users via the customer client device 104 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the processors 804. In one example, the data can be generated using information from the data analysis system 204.

The session replay system 208 is responsible for generating the session replay interface to be displayed by the processors 804 via the experience analytics client 112. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 104 can be reconstructed from the data received from the user's experience analytics script 114 on customer client devices 104. The session replay interface can also include the session replays of a number of different visitor sessions to the client's website within a period of time (e.g., a week, a month, a quarter, etc.). The session replay interface allows the client via the processors 804 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the processors 804 via the experience analytics client 112. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 104) to the website, and illustrates the visited pages and in order in which the pages were visited. The client viewing the journey interface on the processors 804 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the processors 804 via the experience analytics client 112. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 104 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 114 to determine whether an accessibility-enhanced version of the client's website is needed, and can generate the accessibility-enhanced version of the client's website to be displayed by the customer client device 104.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the processors 804 via the experience analytics client 112 on a dashboard of a user interface, as a pop-up element, as a separate panel, etc. In this example, the insights system 216 is responsible for generating an insights interface to be displayed by the processors 804 via the experience analytics client 112. In another example, the insights can be incorporated in another interface such as the zoning interface, the session replay, the journey interface, or the merchandising interface to be displayed by the processors 804.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 104 visiting the client's website). The errors can also include causes of looping behaviors by the users, in-page issues such as unresponsive calls to action and slow loading pages, etc. The errors can be displayed by the processors 804 via the experience analytics client 112 on a dashboard of a user interface, as a pop-up element, as a separate panel, etc. In this example, the errors system 218 is responsible for generating an errors interface to be displayed by the processors 804 via the experience analytics client 112. In another example, the insights can be incorporated in another interface such as the zoning interface, the session replay, the journey interface, or the merchandising interface to be displayed by the processors 804.

The application conversion system 220 is responsible for the conversion of the functionalities of the experience analytics server 122 as provided to a client's website to a client's native mobile applications. For instance, the application conversion system 220 generates the mobile application version of the zoning interface, the session replay, the journey interface, the merchandising interface, the insights interface, and the errors interface to be displayed by the processors 804 via the experience analytics client 112. The application conversion system 220 generates an accessibility-enhanced version of the client's mobile application to be displayed by the customer client devices 104.

Data Architecture

Figure 3:
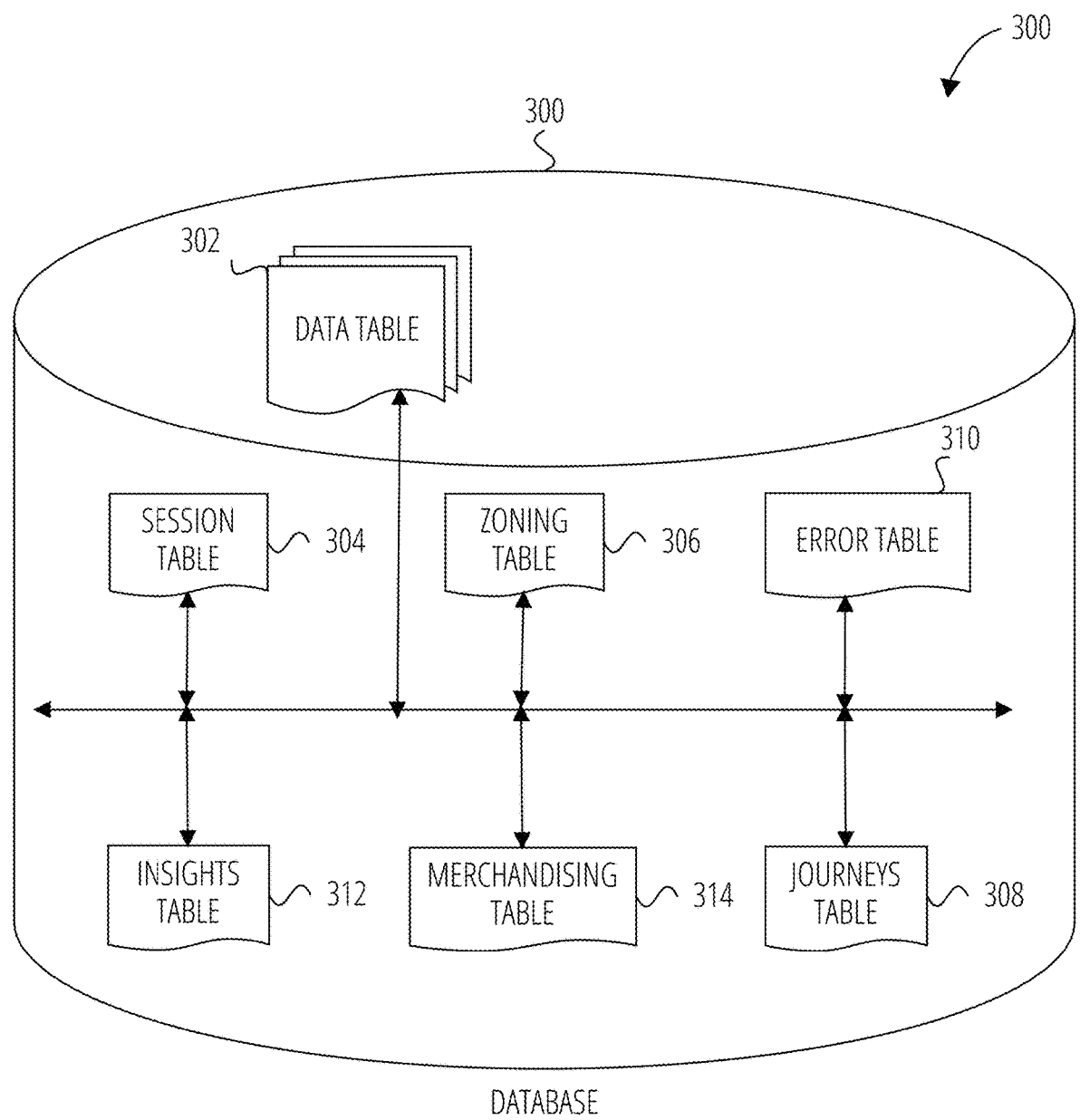
FIG. 3 is a diagrammatic representation of a data structure as maintained in a database, in accordance with some examples.

FIG. 3 is a schematic diagram illustrating database 300, which may be stored in the database 300 of the experience analytics server 122, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 104, the elements on the website being displayed or visible on the interface of the customer client device 104, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications. Session replays may include session events associated with browsing sessions. In one or more embodiments, session events correspond to user interactions with one or more elements, sections, zones (e.g., stored in association with the zoning table 306 discussed below), or the like, of a webpage. Examples of session events include, but are not limited to, user input of entering text in a text box, clicking a button with a mouse, tapping a button with a touchscreen, navigating to a webpage, navigating away from a webpage, scrolling up or down on the webpage, hovering over a webpage element, and the like, as well as any combination thereof. Session replay and recording may be executed by generating one or more logs, lists, and the like, of such events (e.g., as detected by an experience analytics script 114) included in a webpage accessed by a user of the customer client device 104. Such logs, lists, and the like may be stored in the session table 304, and may include one or more event descriptors including the event type, the event target, such as a specific button or text box, the event time, and the like, as well as combinations thereof.

The zoning table 306 stores data related to the zoning for each of the client's websites and native applications including the zones to be created and the zoning overlay associated with the websites and native applications. The journeys table 308 stores data related to the journey of each visitor to the client's website or through the native application. The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

FIG. 4 illustrates an architecture 400 configured to map webpages to page groups, in accordance with some examples. For explanatory purposes, the architecture 400 is primarily described herein with reference to the member client device 102 and the experience analytics server 122 of FIG. 1. However, the architecture 400 may correspond to one or more other components and/or other suitable devices.

In one or more embodiments, the architecture 400 is implemented by the data analysis system 204. For example, the data analysis system 204 may implement the architecture 400 with respect to configuring a website for data analysis. As noted above, the experience analytics system 100 provides web analysis tools, including the tracking and recording of session events corresponding to user interactions with a website, automated website zone identification, session replay, statistical analysis of collected data, and the like. Such tools may require that a website be configured, for example, with respect to properly mapping the pages of the website to page groups. Thus, the architecture 400 is configured to automatically create mappings with qualitative conditions and page categories. Further, the architecture 400 is configured to create page groups (e.g., meaningful page groups), estimate conditions that build each page group, and estimate the page category of each page group.

As shown in FIG. 4, the architecture 400 provides for an automatic mapping module 404 configured to determine page groups from URLs. The automatic mapping module 404 is configured to receive sampled URLs 402 as input, and to determine page groups 406 that correspond to the webpage.

At a high level, the architecture 400 provides for sampling a predefined number of URLs (e.g., N URLs) randomly from one website. For example, N may initially be set to 1000 URLs, corresponding to the number of sampled URLs 402, the sampled URLs 402 being representative of the website. The automatic mapping module 404 includes components 408-414 which are configured to perform the clustering and page group predictions with respect to the sampled URLs 402. In one or more embodiments, the architecture 400 is configured to: compute a pairwise URL distance matrix with the sampled URLs 402 (e.g., via the pairwise URL distance matrix computation module 408); cluster the URLs by applying agglomerative hierarchical clustering on the distance matrix (e.g., via the URL clustering module 410); estimate conditions that characterize each cluster in the dendrogram, where each cluster in the dendrogram is a potential page group candidate (e.g., via the URL pattern and conditions computation module 412, discussed further below with respect to FIG. 6); and estimate the clusters corresponding to the page groups 406 (e.g., via the cluster prediction module 414).

Regarding the sampled URLs 402, the data analysis system 204 is configured to use a set of URLs from a single website. In one or more embodiments, a user (e.g., administrator) may manually build page groups into a mapping using conditions on URLs. Further, created page groups may have a standardized meaning. In one or more embodiments, in a retail website, a home page group, a product, cart, checkout, and the like are created. For example, the URLs satisfying conditions of page groups may represent at least 90% of all URLs traffic with respect to the website, and URLs with high traffic may be deemed "prioritized."

In one example, the data analysis system 204 is configured to sample N URLs for each website by randomly sampling N/2 URLs weighted with traffic (e.g., based on user views). Randomly sampling URLs without weighting on traffic would result in this URL not being picked. As such, the data analysis system 204 may randomly sample N/2 URLs from the remaining samples.

As noted above, a user (e.g., administrator) may manually build page groups using conditions on URLs. Since a human user used them to label the page groups in a specific category, the corresponding terms may be deemed as "prioritized." Such conditions may be used to discern the prioritized terms in URLs and to leverage such terms. For example, the set of terms corresponds to a prioritized terms library (e.g., stored in the database 300).

In one or more embodiments, the pairwise URL distance matrix computation module 408 is configured to assign weights to terms, so as to prioritize the prioritized terms relative to other (e.g., regular) terms. In one or more embodiments, a URL=host+path+query+cvars. It is noted that conventionally, URL=host (or host)+path+query. A path is a sequence of levels, and a query is a set of key values attributes. In addition, cvars are custom variables (key values attributes) sent from the website (e.g., hosted by the third-party server 108) to the experience analytics server system 106 for each visited URL by a user of the website. Terms are path levels, query keys and cvars keys. In one or more embodiments, notations for terms as described herein are defined as follows:

URL: Host\path?query‖cvars
path: level 1\level 2\ . . . Level i\ . . . \Level N=[$l_1$, $l_2$, . . . , $l_i$, . . . $l_N$]
query: k1=v2 & k2=v2={k1, v1, k2=v2}, keys=[k1, k2]; values=[v1, v2]
cvars: k3<v3~k4<v4={k3: v3, k4: v3}; keys=[k3, k4]; values [v3, v4]
terms: path levels & query keys & cvars key={$l_1, l_2, \ldots, l_4$, k1, k2, k3, k4}

In one or more embodiments, the automatic mapping module 404 is configured to estimate website prioritized terms. For a set of URLs for a website, the automatic mapping module 404 extracts website distinct terms (path levels, query keys, cvars keys) for all the URLs. The automatic mapping module 404 then computes the similarity of those terms with the prioritized terms library. For example, terms are considered similar if their levenshtein ratio >80%, where the levenshtein ratio is the levenshetein edit distance normalized over the sum of the length of the strings.

In one or more embodiments, each of path_prioritized_terms, query_prioritized_terms, and cvars_prioritized_terms are automatically found using the prioritized terms library. Distinct terms can be extracted from each URL part (e.g., path levels, query keys, cvars keys). In general, terms include path levels+query keys+cvars keys. As such, a term is considered prioritized if the conditions are met with respect to path levels, query keys and cvar keys as described below.

For path levels, the conditions are met if: (1) a path level is similar to at least one path term in the prioritized terms library (e.g., levenshtein ratio >80%); and (2) the path level is not present in more than 95% of URLs. In this regard, prioritized terms present in a high amount of URLs, or high traffic, may be considered an edge case and are not considered prioritized.

For query keys, the conditions are met if: (1) the query key is similar to at least one query key in the prioritized terms library (e.g., levenshtein ratio >80%); (2) the key is not present in more than 95% of URLs (e.g., URL count wise or traffic count wise); and (3) the key's values maximum does not also exceed 95% of URLs (e.g., URL count wise or traffic count wise).

For cvars keys, the conditions are met if: (1) the cvars key is similar to at least one cvars key in the prioritized terms library (e.g., levenshtein ratio >80%); (2) the key is not present in more than 95% of URLs (e.g., URL count wise or traffic count wise); and (3) the key's values maximum does not also exceed 95% of URLs (e.g., URL count wise or traffic count wise); (4) the key takes less than 30 distinct values; (5) the key takes more than 5 distinct values; and (6) the key takes meaningful values. In other words, for each value of the key, its similarity (e.g., levenshtein ratio) is computed with all the terms in the path prioritized terms library, and the maximum value is kept. If the median of those maximum values is >50%, it is considered that the key takes meaningful values.

Thus, if the above conditions are met for the path levels, query keys and cvar keys, the term is considered prioritized and weights are assigned accordingly. In one or more embodiments, weights are set for each term as follows:
path_weights={term: 0.9 for term in path_prioritized_terms else 0.1}
query_weights={term: 0.9 for term in query_prioritized_terms else 0.1}
cvars_weights={term: 0.9 for term in cvars_prioritized_terms else 0.1}

In addition, weights are set for each URL part as follows:
path_weight=sum(term traffic for each term in path_prioritized_terms)
query_weight=max(term traffic for each term in query_prioritized_terms)
cvars_weight=max(term traffic for each term in cvars_prioritized_terms)
host_weight=0.5*min(path_weight, query_weight, cvars_weight)–host is always less prioritized than other variables.

As noted above, the pairwise URL distance matrix computation module 408 of the automatic mapping module 404 is configured to compute a pairwise URL distance matrix with the sampled URLs 402. In one or more embodiments, the pairwise URL distance matrix computation module 408 implements various formulas in order to generate the pairwise URL distance matrix, based on the above-described notations for terms.

In one or more embodiments, the pairwise URL distance matrix computation module 408 defines functions needed for the distance formula. All defined functions are bounded between [0, 1]. For example, such definitions include:
F: Distance (URL1, URL2): distance between URL1 and URL2.
G: Similarity (URL1, URL2): Similarity between URL1 and URL2.
H: List_Similarity (list1, list2): Similarity between 2 lists
I: Key_values_similarity (dict1, dict2): Similarity between 2 dicts
J: Keys_similarity (dict1, dict2): Similarity between the keys of 2 dicts
K: values_similarity (dict1, dict2): Similarity between the values of 2 dicts
L: string_similarity (str1, str2): Similarity between 2 string values Furthermore, the pairwise URL distance matrix computation module 408 defines all weights used in the distance. For a given path_prioritized_terms list, query_prioritized_terms list, cvars_prioritized_terms list, terms may be defined as follows:
path_terms_weights: ptw={term: 0.9 if term in path_prioritized_terms Else 0.1; for term in website distinct path terms}
query_terms_weights: qtw={term: 0.9 if term in query_prioritized_terms Else 0.1; for term in website distinct query terms}
cvars_terms_weights: ctw={term: 0.9 if term in cvars_prioritized_terms Else 0.1; for term in website distinct cvars terms}
path_weight: pw=Sum (traffic_percentage (term); for term in path_prioritized_terms) (=1% if path prioritized terms Ø)
query_weight: gw=Max (traffic_percentage (term); for term in query_prioritized_terms) (=1% if query prioritized terms Ø)
cvars_weight: cw=Max (traffic_percentage (term); for term in cvars_prioritized_terms) (=1% if cvars prioritized terms Ø)
host_weight: hw=0.5×Min (pw, qw, cw)

where traffic_percentage (term) =

$$\frac{\sum \text{traffic } (URL); \text{ for } URL \text{ in } URLs \text{ where term occur}}{\sum \text{traffic } (URL); URL \text{ in ALL } URLs}$$

In one or more embodiments, it is noted that prioritized path levels rarely co-occur in a single URL contrary to prioritized query/cvars key where one prioritized key can possibly occur in all URLs. This relates to the sum operator for path vs. max for query and cvars.

Moreover, the pairwise URL distance matrix computation module 408 may define formulas as follows:

$$F(URL1,URL2)=1-G(URL1,URL2)$$

$$G(URL1,URL2)=[hw \times L(host1,host2)+pw \times H(Path1,Path2)+qw \times I(query1,query2)+cw \times I(cvars1,cvars2)]/[hw+pw+qw+cw]$$

L (x, y); Given 2 values x and y, is x equal to y?
H (x, y); Given 2 lists x and y of arbitrary length, define the similarity as the average of similarities of lists of same length:
1. Transform pair (x, y) to 2 pairs of same length: (Longer_list, shorter_list_padded) and (shorter_list, longer_list_cropped) where
   (longer_list, shorter_list)=(x, y) if length (x)>, length (y) Else (y, x)
   shorter_list_padded: pad shorter_list with empty values to match longer_list length
   longer_list_cropped: crop longer_list values (from the end) to match shorter_list length
2. H(x, y)=[M(longer_list, shorter_list_padded)+M(longer_list_cropped, shorter_list)]/2 where
   M(a, b)=Sum (weighting DOT term_equality)/Sum (weighting)
   term_equality=[L($a_i$, $b_i$); for i in [1, length (a)]

$$\text{weighting} = \left[ \frac{Ptw(a_i) + Ptw(b_i)}{2} \right];$$

for i in [1, length (a)]

I(x, y); Given 2 dictionaries x and y, I(x, y)=[J(x, y)+K(x, y)]/2, Let c_keys be the common keys between keys(x) & keys(y)

J(x, y) is the weighted average ratio of common keys $$J(x, y) = \left[ \frac{\text{Sum}(qtw(k)); \text{for } k \text{ in c\_keys}}{\text{Sum}(qtw(k)); \text{for } k \text{ in } x} + \frac{\text{Sum}(qtw(k)); \text{for } k \text{ in c\_keys}}{\text{Sum}(qtw(k)); \text{for } k \text{ in } y} \right]/2;$$

qtw used for query, ctw for cvars

K(x, y) is the weighted average of values equality of common keys k(x, y)=sum(weighting DOT values_equality)/sum (weighting)

where values_equality=[L(x[k], y[k]); for k in c_keys]

weighting=[qtw [k], for k in c_keys]; qtw used for query, ctw for cvars

As noted above, the automatic mapping module 404 includes the URL clustering module 410. The URL clustering module 410 is configured to perform an agglomerative hierarchical clustering on the sampled URLs 402, to generate a dendrogram.

In one or more embodiments, the agglomerative hierarchical clustering as performed by the URL clustering module 410 corresponds to a bottom-up clustering approach. For example, the URL clustering module 410 considers all data points (e.g., all of the sampled URLs 402) as clusters (e.g., group of URLs). Clusters are merged up the hierarchy until one large cluster is formed. The agglomerative hierarchical clustering results in a dendrogram, which is a diagram representing all the progressive merging steps from N data points to the large one cluster as depicted in FIGS. 5A and 5B below. As discussed below, final clusters/page groups may be estimated by detecting prioritized nodes.

In one or more embodiments, the clusters are determined by grid searching the number of clusters between a predefined range of clusters (e.g., between 10 and 40 clusters, an arbitrary range). For example, the URL clustering module 410 is configured to compute the silhouette score for each n_clusters (e.g., chosen as the decision metric as it does not necessarily require ground truth clustering knowledge). As described herein, the silhouette score is a metric used to calculate the "goodness" of a clustering technique. The silhouette score has a value that ranges from −1 to 1, where 1 indicates clusters are well apart from each other and clearly distinguished, and 0 indicates clusters are indifferent (e.g., the distance between clusters is not significant).

The URL clustering module 410 then picks N (e.g., the chosen number of clusters) such that N is in the set of n_clusters satisfying silhouette score >a preset percentile (e.g., 96% percentile) of all silhouette scores, and N is as small as possible. In this manner, it is possible to achieve a high score without having many clusters.

As noted above, the URL pattern and conditions computation module 412 is configured to automatically characterize each page group, as opposed to simply listing out the URLs for each cluster without characterization. For example, in one or more embodiments, the URL pattern and conditions computation module 412 is configured to detect patterns, by identify repeating terms that constitute a pattern. When a pattern is detected, the URL pattern and conditions computation module 412 generates conditions that would characterize the set of URLs. The URL pattern and conditions computation module 412 is discussed further below with respect to FIG. 6.

Thus, with respect to estimating clusters, the URL clustering module 410 is configured to determine an initial N number of clusters (e.g., with the silhouette score grid searching method), and the URL pattern and conditions computation module 412 is configured to compute conditions for each cluster. As noted above, the automatic mapping module 404 further includes the cluster prediction module 414, which is configured to estimate the clusters corresponding to the page groups 406.

In this regard, the automatic mapping module 404 is configured to estimate clusters using two approaches. In the first estimation approach, the URL clustering module 410 determines an initial number of clusters as discussed above. In particular, the number of clusters N is selected such N is in the set of n_clusters satisfying silhouette score >a preset percentile (e.g., 96% percentile) of all silhouette scores, and N is as small as possible.

In the second estimation approach, the URL pattern and conditions computation module 412 computes conditions for each cluster. The automatic mapping module 404 further includes the cluster prediction module 414. In one or more embodiments, the cluster prediction module 414 is configured to detect prioritized nodes. For example, a node (cluster) is deemed prioritized if (1) its set of conditions contains a prioritized term, (2) the node has at least 2 URLs or at least 0.5% traffic and (3) the node has less than 80% of global number of URLs or less than 80% of traffic.

In addition, for the second estimation approach, the cluster prediction module 414 estimates (guesses) new clusters. For example, the cluster prediction module 414 is configured to (1) start from the dendrogram root node, (2) develop nodes recursively in a top down approach, (3) stop developing when a prioritized node is found, and (4) for all tree branches without a prioritized node, collapse the branches to maximum without collapsing a prioritized node (e.g., referred to as pseudo prioritized nodes).

Moreover, the automatic mapping module 404 is configured such that, if the number of new clusters found is greater than a preset number (e.g., >50), then the initial clustering per the above first estimation approach is not overwritten (e.g., to prevent the tree from developing too far to result in burst clustering).

Thus, the automatic mapping module 404 provides for sampling N URLs randomly from one website (e.g., N=1000 by default) as described above with respect to the sampled URLs 402. Next, the pairwise URL distance matrix computation module 408 computes the pairwise URL distance matrix. The URL clustering module 410 then provides for clustering URLs by applying agglomerative hierarchical clustering on the distance matrix. Next, the URL pattern and conditions computation module 412 computes URLs patterns and conditions for each cluster of the dendrogram. From the resulted dendrogram, the cluster prediction module 414 provides for determining (e.g., guessing) the clusters as page groups.

Moreover, the automatic mapping module 404 is configured to automatically characterize each page group of the page groups 406, based on the output provided by URL pattern and conditions computation module 412 (e.g., as discussed further with respect to FIG. 6 below). As described herein, the URL pattern and conditions computation module 412 is configured to detect patterns, by identifying repeating terms that constitute a pattern. When a pattern is detected, the URL pattern and conditions computation module 412 generates conditions that would characterize the set of URLs.

FIGS. 5A and 5B illustrate example dendrograms 502-504 in which URLs are grouped into clusters, in accordance with some examples. As noted above, a dendrogram is a diagram representing all the progressive merging steps from N data points (e.g., the sampled URLs 402).

In the example of FIG. 5A, the dendrogram 502 depicts circles representing different clusters for nodes A-K. In the example of FIG. 5B, the dendrogram 504 depicts a tree structure at which edges terminate at the nodes A-K.

In both of the examples of FIGS. 5A-5B, all data points (e.g., nodes A-K representing the sampled URLs 402) are grouped into clusters. The clusters are merged up the hierarchy until one large cluster is formed.

Figure 6:
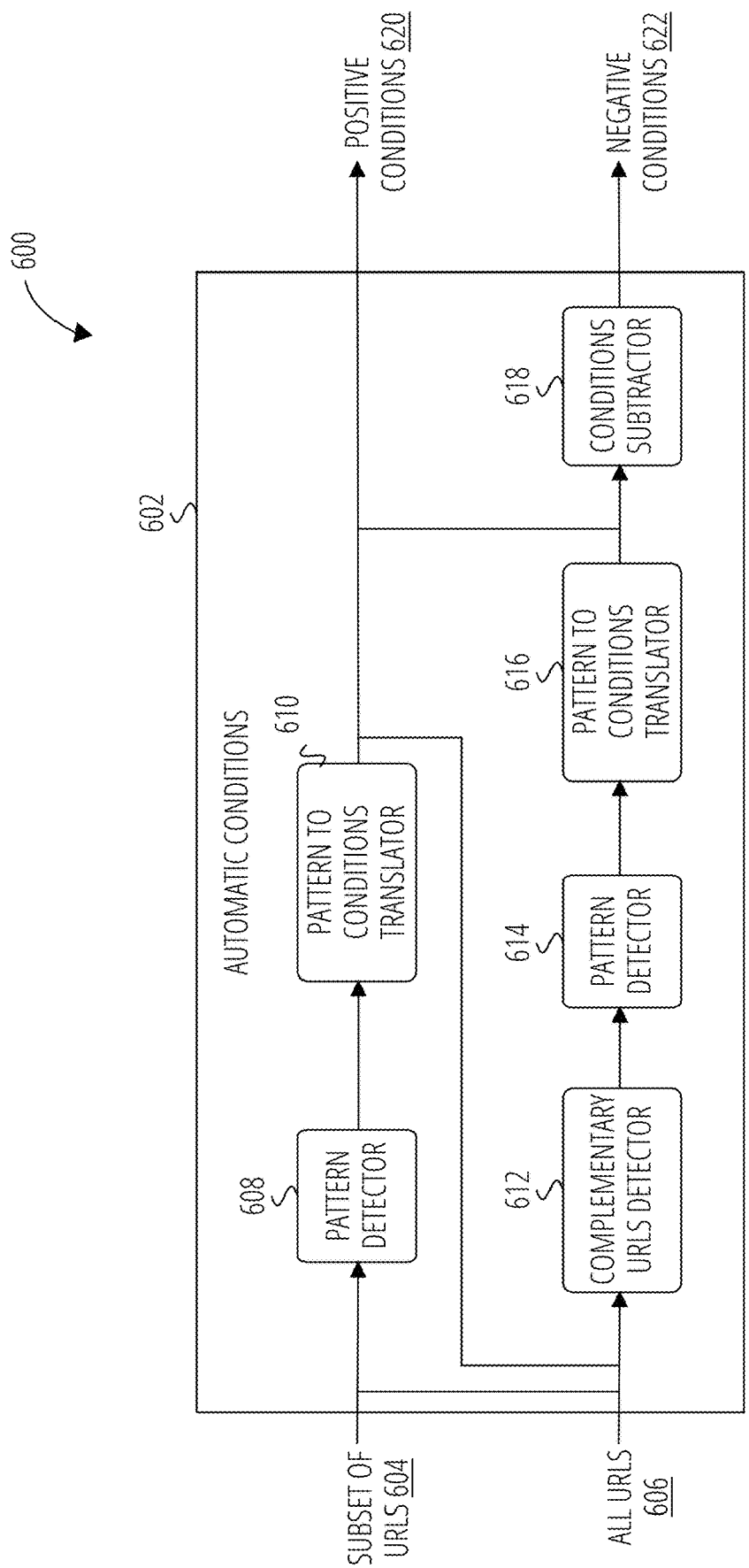
FIG. 6 illustrates an architecture configured to determine conditions for a set of webpages, in accordance with some examples.

FIG. 6 illustrates an architecture 600 configured to determine conditions for a set of webpages, in accordance with some examples. For explanatory purposes, the architecture 600 is primarily described herein with reference to the experience analytics system 100 of FIG. 1. However, the architecture 600 may correspond to one or more other components and/or other suitable devices.

In one or more embodiments, the architecture 600 may be implemented by the data analysis system 204. In addition, the architecture 600 corresponds to the URL pattern and conditions computation module 412 of FIG. 4.

For a set of URLs coming from a single website, the cardinality of values is typically finite and low with respect to the levels in paths, key presence/value in query or cvars that make up the URL. The architecture 600 is configured to identify repeating terms in a set of URLs that would constitute a pattern. From the identified pattern(s), the architecture 600 generates conditions that characterize the set of URLs.

As shown in the example of FIG. 6, the architecture 600 includes an automatic conditions module 602 configured to determine conditions from URLs. The automatic conditions module 602 is configured to receive a subset of URLs 604 and all URLs 606 as input. The automatic conditions module 602 includes a pattern detector 608 and pattern to conditions translator 610 configured to analyze the subset of URLs 604, and to generate the positive conditions 620. The automatic conditions module 602 further includes a complementary URLs detector 612 configured to receive the subset of URLs 604 and all URLs 606 as input. The automatic conditions module 602 further includes a pattern detector 614, a pattern to conditions translator 616, and a conditions subtractor 618, which combined are configured to generate the negative conditions 622 as output.

In one or more embodiments, the subset of URLs 604 of FIG. 6 corresponds with the nodes for each cluster determined by the URL clustering module 410 of FIG. 4. Moreover, all URLs 606 of FIG. 6 corresponds with the sampled URLs 402, which are representative of the website as discussed above. Alternatively, all URLs 606 of FIG. 6 may correspond to all URLs that comprise the website.

As noted above, URL=host (or host)+path+query+cvars. Regarding the pattern detector 608, the pattern for the subset of URLs 604 may be considered as follows: pattern(subset of URLs)=pattern(subset of host) and pattern(subset of paths) and pattern(subset of queries) and pattern(subset set of cvars). In general, the pattern detector 608 is configured to identify statistically repeating patterns in fields.

For example, for a given field (e.g., host or a path level or a query/cvars key or a query/cvars key's value): (1) if the possible values of the field are N values (e.g., where N is a fixed value which is not relatively high), then those possible values constitute a pattern for that field (e.g., field=value 1 or value 2 or . . . value N); (2) if condition (1) is not met, and if the possible values of the field are M values (e.g., where M is relatively high and each value occurs roughly once or twice), then the field corresponds to a pseudo-pattern (e.g., associated with pseudo-ids values, where the pattern is represented by a special character such as "*"); (3) if conditions (1) and (2) are not met, the field's pattern is set to the values that occur more than X % (e.g., where X is fixed and predefined), so as to only keep values that are statistically high. It is noted that the pattern in condition (3) can be empty (e.g., where all values are present <X %). Based on conditions (1)-(3), it is possible that a pattern can partially describe a field.

With respect to a host for the subset of URLs 604, the pattern detector 608 may implement a host pattern detector. In one or more embodiments, for a set of hosts, the pattern detector 608 is configured to detect patterns as follows: (1) if the distinct values <N, then the host's pattern is set to all of those values; (2) if there are too many (e.g., M) unique values appearing rarely (e.g., once or twice), the host's pattern is set to pseudo-ids and flagged as (3) otherwise, the host's pattern is set to values where the ratio presence >X %. In one or more embodiments, X is denoted host_ratio_thr and N is denoted host_cardinality_thr as discussed further below.

By way of non-limiting example, patterns for hosts are generated as follows based on the following: 9 hosts, N=6, X=20%.

| host | values |
|------|--------|
| host1 | www.mywebsite.com |
| host2 | www.order.mywebsite.com |
| host3 | www.order.mywebsite.com |
| host4 | www.pro.mywebsite.com |
| host5 | www.prod.mywebsite.com |
| host6 | www.mywebsite.com |
| host7 | www.mywebsite.com |
| host8 | www.staging.mywebsite.com |
| host9 | www.pre-prod.mywebsite.com |

The corresponding values distribution is as follows:

| value | % | occurrence |
|-------|---|------------|
| www.mywebsite.com | 33.33% | 3 |
| www.order.mywebsite.com | 22.2% | 2 |
| www.pro.mywebsite.com | 12.5% | 1 |
| www.prod.mywebsite.com | 12.5% | 1 |
| www.staging.mywebsite.com | 12.5% | 1 |
| www.pre-prod.mywebsite.com | 11.1% | 1 |

Based on the above, the pattern detector 608 is configured to apply conditions as follows: (1) too many distinct values; (2) not all values always appear once or twice; and (3) keep values with ration presence >20%. Thus, the pattern detector 608 may set patterns as follows:
host pattern={"www.mywebsite.com": 0.33, "www.order.mywebsite.com": 0.22}

With respect to paths for the subset of URLs 604, the pattern detector 608 may implement a path pattern detector. In one or more embodiments, the pattern detector 608 is configured to: (1) pad paths to the longest path length with an special empty value; (2) for each path level, compute the level's values distributions (a) if its distinct values <N then the level's pattern=all of those values, (b) if too many unique values appearing rarely (e.g., once or twice), the level's pattern is pseudo-ids and flagged as "*" and (c) otherwise, the level's pattern=values with ratio presence >X %; (3) any level after the shortest path length is considered optional. In one or more embodiments, X is denoted path_ratio_thr, and N is denoted path_cardinality_thr as discussed further below.

By way of non-limiting example, patterns for paths are generated as follows based on the following: 9 paths, N=6, X=30%.

|  | level1 | level2 | level3 | level4 |
|---|---|---|---|---|
| path 1 | p | 65678 | cart | payment |
| path2 | p | 165353 | checkout | delivery |
| path3 | p | 1677777 | checkout | delivery |
| path4 | p | 6541 | cart | delivery |
| path5 | p | 7766 | cart | ' ' |
| path6 | p | 98 | shoes | ' ' |
| path7 | p | 097 | bring | ' ' |
| path8 | p | 556 | hello | ' ' |
| path9 | p | 15 | hi | ' ' |

| Level 1 | | |
|---|---|---|
| value | % | occurrence |
| p | 100% | 8 |

Level 1 indicates one unique value. As such, the pattern detector 608 may set the pattern as follows: pattern={"p": 1.0}.

| Level 2 | | |
|---|---|---|
| value | % | occurrence |
| 65678 | 11.1% | 1 |
| 165353 | 11.1% | 1 |
| 1677777 | 11.1% | 1 |
| 6541 | 11.1% | 1 |
| 7766 | 11.1% | 1 |
| 98 | 11.1% | 1 |
| 097 | 11.1% | 1 |
| 556 | 11.1% | 1 |
| 15 | 11.1% | 1 |

Level 2 indicates too many distinct values, and all values always appear once or twice. As such, the pattern detector 608 may set the pattern as follows: pattern={"*": 0}.

| Level 3 | | |
|---|---|---|
| value | % | occurrence |
| cart | 33.33% | 3 |
| checkout | 22.2% | 2 |
| shoes | 12.5% | 1 |
| bring | 12.5% | 1 |
| hello | 12.5% | 1 |
| hi | 11.1% | 1 |

Level 3 indicates too many distinct values, not all values always appear once or twice, and to keep values with ratio presence >30%: cart with 33.33% ratio. As such, the pattern detector 608 may set the pattern as follows: pattern={"cart": 0.33}.

| Level 4 | | |
|---|---|---|
| value | % | occurrence |
| ' ' | 55.55% | 5 |
| delivery | 33.33% | 3 |
| payment | 11.1% | 1 |

Level 4 indicates only 3 unique values. As such, the pattern detector 608 is configured to keep all of them and set the pattern as follows: pattern={"Ø": 0.555, "delivery": 0.333, "payment": 0.111}.

Moreover, based on the above, the pattern detector 608 is configured to set the path pattern as follows:

path pattern={"required": 3, "levels": [{"p": 1.0}, {"*": 0}, {"Ø": 0.555}, {"delivery": 0.333}, {"payment": 0.111}]}.

With respect to queries (or cvars) for the subset of URLs 604, the pattern detector 608 may implement a query/cvars pattern detector. For a set of queries (or cvars), the pattern detector 608 is configured to: (1) compute distinct keys: union of the keys appearing in all queries (or cvars); (2) determine that a key is considered frequent if its ratio presence >X1%, where key patterns considers only frequent keys; (3) for each frequent key, (a) determine its values in each query (or cvars). If the value not present, use an empty special value, (b) compute the key's value values distributions, such that (i) if distinct values <N then the key's value's pattern=all of those values, and (ii) if too many unique values appearing rarely (e.g., once or twice), the key's value's pattern is pseudo-ids and flagged as "*", (iii) else the key's value's pattern=values with ratio presence >X2%.

By way of non-limiting example, patterns for queries are generated as follows based on the following: 9 queries, X1=30%, N=6, X2=20%. In one or more embodiments, X1 is denoted query_k_ratio_thr (or cvars_k_ratio_thr), X2 is denoted query_v_ratio_thr (or cvars_k_ratio_thr), and N is denoted query_v_cardinality_thr (or cvars_v_cardinality_thr) as discussed further below.

|  | k1 | k2 | k3 | k4 |
|---|---|---|---|---|
| query1 | v1 | v2 | v3 | ' ' |
| query2 | v1 | v4 | v6 | v7 |
| query3 | v8 | ' ' | v9 | ' ' |
| query4 | v1 | ' ' | ' ' | ' ' |
| query5 | ' ' | ' ' | v10 | ' ' |
| query6 | ' ' | ' ' | v11 | ' ' |
| query7 | ' ' | ' ' | v3 | ' ' |
| query8 | v1 | ' ' | v3 | ' ' |
| query9 | v1 | ' ' | v12 | ' ' |

The corresponding keys' values distribution are as follows:

| key | % | occurrence |
|---|---|---|
| k1 | 66.66% | 6 |
| k2 | 22.22% | 2 |
| k3 | 88.88% | 8 |
| k4 | 11.11% | 1 |

As shown above, k1 and k3 are the only keys with ratio presence >30%. Thus, the pattern detector 608 may only consider the values of those keys. In this regard, k1's value values distributions are as follows:

| value | % | occurrence |
|-------|-------|------------|
| v1    | 55.5% | 5          |
| ' '   | 33.33%| 3          |
| v8    | 11.1% | 1          |

The above indicates 3 unique values only. As such, the pattern detector 608 is configured to set the pattern as follows: pattern={"v1": 0.555, "Ø": 0.333, "v8": 0.111}.

Moreover, k3's value values distribution is as follows:

| value | % | occurrence |
|-------|-------|------------|
| v3    | 33.33%| 3          |
| v6    | 11.1% | 1          |
| v9    | 11.1% | 1          |
| ' '   | 11.1% | 1          |
| v10   | 11.1% | 1          |
| v11   | 11.1% | 1          |
| v12   | 11.1% | 1          |

The above indicates too many distinct values, not all values always appear once or twice, and to keep values with a ratio presence >20%. As such, the pattern detector 608 is configured to set the pattern as follows: pattern={"v3": 0.33}.

Moreover, the pattern detector 608 is configured to set the query pattern as follows:

query pattern={"k1": {"ratio": 0.666, "values": {"v1": 0.555, "Ø": 0.333, "v8": 0.111}}, "k3": {"ratio": 0.888, "values": {"v3": 0.33}},}.

In one or more embodiments, the pattern detector 608 is configured to implement a pattern format as follows:
{
  "host": {"host_1": 0.5, "host_2": 0.3},
  "path": {"required": 2, "levels": [{"l1_value1": 1.0}, {"*": 0}, {"l3_value1": 0.5, "l3_value2": 0.3}]},
  "query": {
    "q_key_1": {"ratio": 0.4, "values": {"*": 0}},
    "q_key_2": {"ratio": 1.0, "values": {"key_2_v1": 0.9, "key_2_v2": 0.1}}
  },
  "cvars": {
    "c_key_1": {"ratio": 1.0, "values": {"key_1_v1": 1.0}},
    "c_key_2": {"ratio": 1.0, "values": { }},
  },
}

Based on the above, and with respect to hosts, the pattern detector 608 is configured such that the host takes at least 2 possible values: host_1 present 50% of the time, host_2 present 30% of the time. The path has 2 required levels (level 1 and 2), where level 1 always takes the same value: l1_value, level 2 takes pseudo-ids values (values appearing once or twice), level 3 takes at least 2 possible values: l3_value1 present 50% of the time, l3_value2 present 30% of the time (e.g., level 3 values ratio cannot sum to 1 as it is not a required level).

Regarding queries, the pattern detector 608 is configured such that: key q_key_1 is present 40% of the time and takes pseudo_ids values; key q_key_2 is always present, and takes only 2 possible values: key_2_v1 present 90% of the time and key_2_v2 present 10% of the time.

Regarding cvars, the pattern detector 608 is configured such that: key c_key_1 is always present, and always takes one value key_1_v1; and key c_key_2 is always present, and takes some values without a clear pattern.

Thus, the pattern detector 608 is configured to identify patterns for the host, path, query and cvars fields of the subset of URLs 604. The identified patterns are provided as input to the pattern to conditions translator 610, which is configured to generate conditions from the identified patterns. In one or more embodiments, the pattern to conditions translator 610 is configured to look for segments of URLs whose ratio sum=1, indicating always present.

By way of non-limiting example, the pattern to conditions translator 610 generates conditions as follows. For the example {"v1": 0.7, "v2": 0.3}, this field takes at least v1 and v2 as possible values, but because their presence ratio sums to 1, this field takes only v1 and v2 as values. The pattern to conditions translator 610 generates a condition: field=v1 or field=V2.

For the example {"v1": 0.5, "v2": 0.3}, this field takes at least v1 and v2 as possible values. However, because v1 and V2 do not cover all the values cases (e.g., as summing to 80%), the pattern to conditions translator 610 does not generate a condition on this field.

For the example "key": {"ratio": 0.8, "values": {"key_1_v1": 0.8}}, the key is present 80% of the time. As such, the pattern to conditions translator 610 does not generate any condition on this key.

Regarding hosts, the pattern to conditions translator 610 may implement a host to conditions translator configured as follows: if the sum of values ratio=1, generate a condition else empty condition. For example, the {"host1": 0.7, "host2": 0.3}=>{"host": {"host1", "host2"}}. In another example, the {"host1": 0.5, "host2": 0.3}=>{"host": { }}.

Regarding paths, the pattern to conditions translator 610 may implement a path to conditions translator as follows: conditions are generated only on required levels; for each level, the same logic of values summing to 1 is applied. For example, "path": {"required": 2, "levels": [{"l1_value1": 1.0}, {"*": 0}, {"l3_value1": 0.5, "l3_value2": 0.3}]}=>{"path": {0: {"l1_value1"}}}. In another example, "path": {"required": 0, "levels": [{"l1_value1": 0.8}, {"*": 0}]}=>{"path": { }}.

Regarding queries and/or cvars, the pattern to conditions translator 610 may implement a query/cvars to conditions translator as follows: conditions are only generated for keys whose ratio=1 (e.g., always present); for each key's values, the same logic of values summing to 1 is applied; exclude from any key's values, special values: "*" (for pseudo-ids) and "0" (for empty value). For example, "k1": {"ratio": 1.0, "values": {"v1": 0.5, "v2": 0.5}}=>=>{"query": {"k1": {"v1", "v2"}}}. In another example, "k1": {"ratio": 0.8, "values": {"v1": 0.3, "v2": 0.5}}=>=>{"query": { }}. In another example, "k1": {"ratio": 1.0, "values": {"v1": 0.5, "v2": 0.3}}=>=>{"query": {"k1": { }}}. In another example, "k1": {"ratio": 1.0, "values": {"v1": 0.5, "v2": 0.3, "Ø": 0.2}}=>=>{"query": {"k1": { }}}.

Thus, with respect to the positive conditions 620, the pattern detector 608 is configured to implement a conditions format as follows:
{
  "host": {"host_1"},
  "path": {0: {"l0_value1"}, 2: {"l2_value1", "l2_value2"}},
  "query": {
    "q_key_1": { },
    "q_key_2": {"q_k2_v1", "q_k2_v2"}
  },
  "cvars": { },
}

Based on the above, the pattern to conditions translator 610 is configured such that the host=host_1. For the path, level 0=l0_value1 and level 2=(l2_value1 or l2_value2). For the query, q_key_1 is present and q_key_2=(q_k2_v1 or q_k2_v2).

Thus, the pattern to conditions translator 610 is configured to output positive conditions 620 based on the subset of URLs 604, the pattern detector 608 and the pattern to conditions translator 610. In one or more embodiments, the automatic conditions module 602 is configured to compute the positive conditions 620 (e.g., conditions satisfying the subset of URLs 604) but also to compute negative conditions 622 (e.g., conditions that discriminate the subset of URLs 604 from the remaining URLs of all URLs 606). As such, the architecture 600 provides for receiving both the subset of URLs 604 and all URLs 606.

At a high level, given a set of "URLs A" (e.g., the subset of URLs 604) belonging to all website "URLs B" (e.g., all URLs 606), the automatic conditions module 602 computes the positive conditions of URLs A (e.g., the positive conditions 620, or "conditions A"). From URLs B, the automatic conditions module 602 is configured to determine all URLs not belonging to A and satisfying conditions A (e.g., as "URLs C"). The automatic conditions module 602 is configured to compute conditions for URLs C (e.g., as "conditions C"). As such, the negative conditions of URLs A (e.g., "negative conditions A") can be computed as: conditions C−conditions A. In addition, the conditions of A can be computed as: conditions A+negative conditions A.

For example, with respect to FIG. 6, given the subset of URLs 604 belonging to all URLs 606 of a given website, the pattern detector 608 and the pattern to conditions translator 610 are configured to compute the positive conditions 620 (e.g., conditions A) of the subset of URLs 604. From all URLs 606, the complementary URLs detector 612 selects all remaining URLs not belonging to the subset of URLs 604 and satisfying the positive conditions 620. The pattern detector 614 and the pattern to conditions translator 616 are configured to compute conditions for the remaining URLs (e.g., conditions C). In this regard, the pattern detector 614 and the pattern to conditions translator 616 are configured to perform similar functions as the pattern detector 608 and the pattern to conditions translator 610, but with respect to the remaining URLs. The conditions subtractor 618 computes the negative conditions 622 for subset of URLs 604 (e.g., as conditions C−conditions A). In addition, the automatic conditions module 602 computes the final (net) conditions of A (e.g., as conditions A+negative conditions A).

Thus, with respect to the positive conditions 620 and the negative conditions 622, the pattern detector 608 is configured to implement a conditions format as follows:
{
  "positive": {
    "host": [ ],
    "path": {0: ["legal-cookies"]},
    "query": { },
    "cvars": {
      "page type": ["CGU"],
      "local path": [ ],
    },
  },
  "negative": {
    "host": ["it.website.com", "us.website.com"],
    "path": {1: ["pbl-terms-conditions-outlet-stores"]},
    "query": { },
    "cvars": {"redirection": ["social"]},
  },
}

Based on the above, the automatic conditions module 602 is configured such that host NOT=(it.website.com OR us.website.com). For the path, level 0=legal-cookies and level 1 NOT=pbl-terms-conditions-outlet-stores. For the cvars, page type=CGU, local path is present, and redirection NOT=social.

In one or more embodiments, the automatic conditions module 602 is configured to detect alias similarity. For example, an alias corresponds to a set of conditions manually input by the user. These conditions translate into a set of URLs for a fixed time duration. Comparing two alias corresponds with comparing their set of URLs. The automatic conditions module 602 is configured to determine that aliases are duplicates if they have the same set of URLs. For example, similarity is determined as follows:
Similarity(alias 1, alias 2)=IOU(URLs 1, URLs 2)=length (Intersection(URLs1, URL2))/length(Union(URLs1, URLs2))

The automatic conditions module 602 is configured to determine that alias 1 is a duplicate of alias 2 if Similarity (alias 1, alias 2)=1.

Alternatively or in addition, an alias may correspond to a set of automatically generated conditions. Two aliases are duplicates if they have the same conditions. For example, similarity is determined as follows:
Similarity(alias 1, alias 2)=Similarity(conditions1, conditions2); where conditions are generated from the automatic conditions module 602 (URLs of alias)
Similarity(conditions1, conditions2)=(Similarity(host conditions 1, host conditions 2)+Similarity(path conditions 1, path conditions 2)+Similarity(query conditions 1, query conditions 2)+Similarity(cvars conditions 1, cvars conditions 2))/4
Similarity(host conditions 1, host conditions 2)=IOU(host values 1, host values 2)
Similarity(path conditions 1, path conditions 2)=Mean over levels of (IOU(level values 1, level values 2)); if level not present in conditions, use an empty set of values
Similarity(query conditions 1, query conditions 2)=Mean over keys of (IOU(key values 1, key values 2)); if key not present in conditions, use an empty set of values.

In one or more embodiments, the automatic conditions module 602 is configured to apply the above logic of query to cvars.

By way of non-limiting example, the automatic conditions module 602 may be configured to make the above-noted thresholds of host_cardinality_thr, path_cardinality_thr, query_v_cardinality_thr, cvars_v_cardinality_thr a dynamic function of URLs length as follows: for positive pattern detector: 1% of URLs, min to 10, max to 21; for negative pattern detector: 1% of URLs, min to 70, max to 101. In addition, one or more of the pattern to conditions translator 610 or the pattern to conditions translator 616 may be configured to look for segments of URLs whose ratio presence sum >99.9% (instead of =100%).

Thus, the automatic conditions module 602, corresponding to the URL pattern and conditions computation module 412, is configured to automatically characterize each page group of the page groups 406, as opposed to simply listing out the URLs for each cluster without characterization. In doing so, the automatic conditions module 602 detects patterns, by identify repeating terms that constitute a pattern. When a pattern is detected, the automatic conditions module 602 generates conditions (e.g., conditions A+negative conditions A, as noted above) that would characterize the set of URLs.

Figure 7:
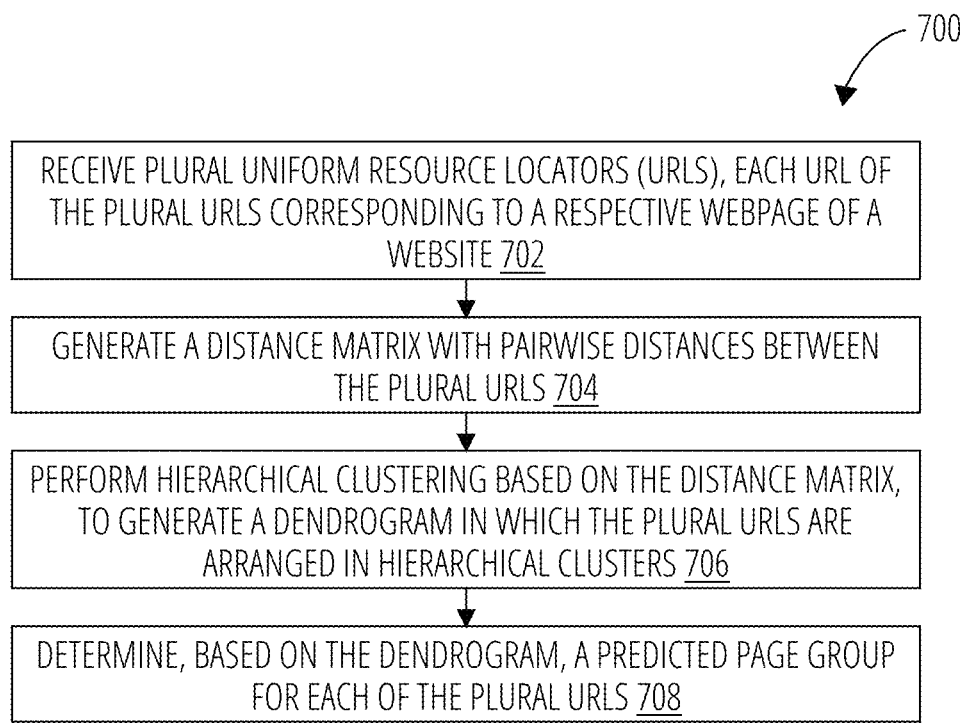
FIG. 7 is a flowchart illustrating a process for mapping webpages to page groups, in accordance with some examples.

FIG. 7 is a flowchart illustrating a process 700 for mapping webpages to page groups, in accordance with some examples. For explanatory purposes, the process 700 is primarily described herein with reference to the experience analytics server 122 of FIG. 1. However, one or more blocks (or operations) of the process 700 may be performed by one or more other components, and/or by other suitable devices. Further for explanatory purposes, the blocks (or operations) of the process 700 are described herein as occurring in serial, or linearly. However, multiple blocks (or operations) of the process 700 may occur in parallel or concurrently. In addition, the blocks (or operations) of the process 700 need not be performed in the order shown and/or one or more blocks (or operations) of the process 700 need not be performed and/or can be replaced by other operations. The process 700 may be terminated when its operations are completed. In addition, the process 700 may correspond to a method, a procedure, an algorithm, etc.

The experience analytics server 122 receives plural Uniform Resource Locators (URLs), each URL of the plural URLs corresponding to a respective webpage of a website (block 702). The experience analytics server 122 generates a distance matrix with pairwise distances between the plural URLs (block 704).

The experience analytics server 122 may access, from a database, a set of terms, the set of terms having been predetermined as prioritized. The pairwise distances may be based on weights applied to URLs, of the plural URLs, having at least one term appearing within the set of terms. The experience analytics server 122 may extract distinct terms for the plural URLs, and compute a similarity of the distinct terms with the set of terms, based on a levenshtein ratio for the similarity exceeding a predefined value.

The experience analytics server 122 performs hierarchical clustering based on the distance matrix, to generate a dendrogram in which the plural URLs are arranged in hierarchical clusters (block 706). The experience analytics server 122 may compute URL patterns and conditions for each cluster within the hierarchical clusters.

The hierarchical clustering may include agglomerative hierarchical clustering. Determining the hierarchical clusters may include performing grid searching with respect to a preset range of clusters, computing a silhouette score for each cluster within the preset range of clusters, and determining the hierarchical clusters based on the computed silhouette scores. Determining the hierarchical clusters may be further based on identifying nodes within the dendrogram having conditions that include at least one term within the set of terms.

The experience analytics server 122 determines, based on the dendrogram, a predicted page group for each of the plural URLs (block 708).

Machine Architecture

Figure 8:
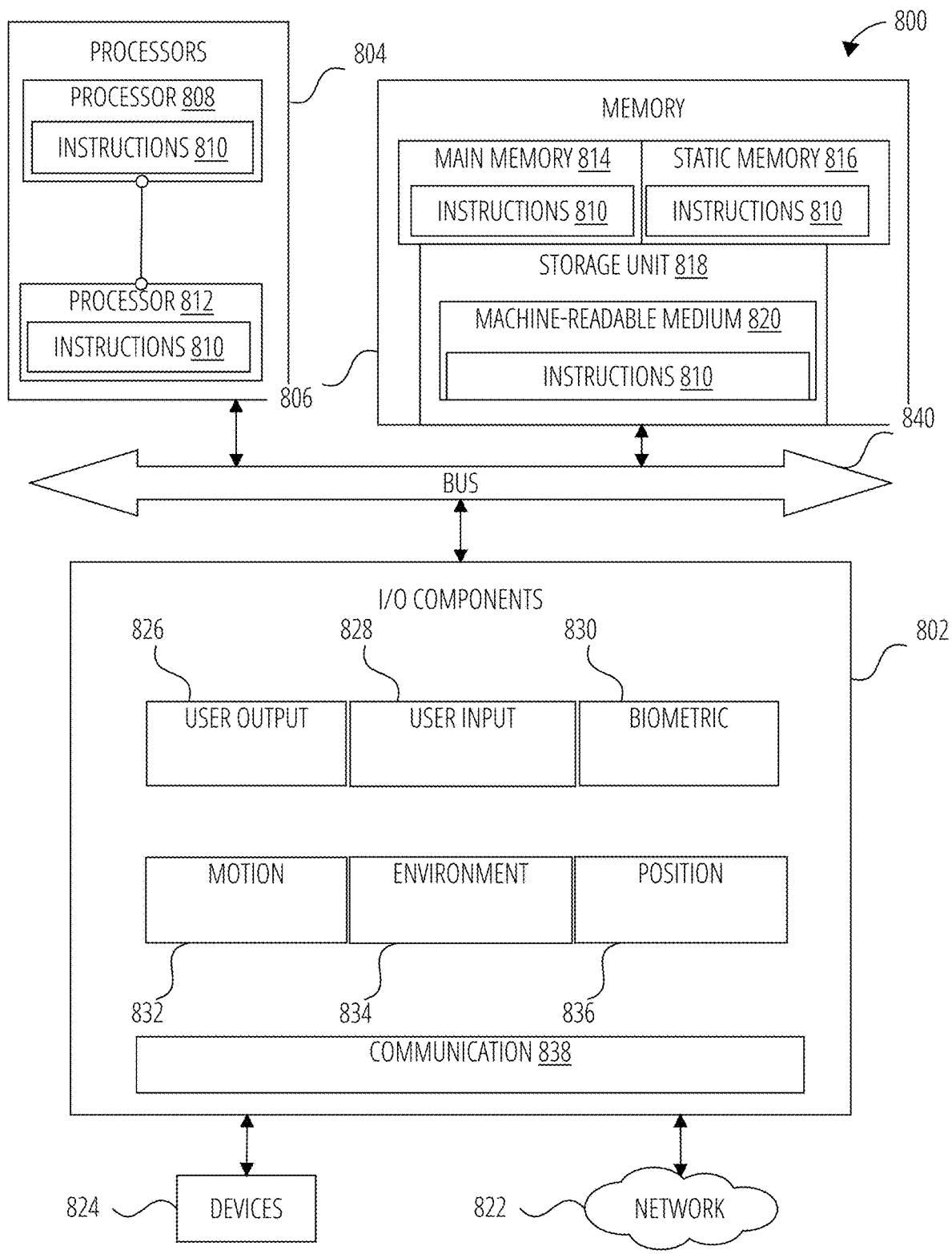
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 810 (e.g., software, a program, an application, an applet, an application, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the processors 804 or any one of a number of server devices forming part of the experience analytics server 122. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the processors 804 may have a camera system comprising, for example, front cameras on a front surface of the processors 804 and rear cameras on a rear surface of the processors 804. The front cameras may, for example, be used to capture still images and video of a user of the processors 804 (e.g., "selfies"). The rear cameras may, for example, be used to capture still images and videos in a more traditional camera mode. In addition to front and rear cameras, the processors 804 may also include a 360° camera for capturing 360° photographs and videos.

Further, the camera system of a processors 804 may include dual rear cameras (e.g., a primary camera as well as a depth-sensing camera), or even triple, quad or penta rear camera configurations on the front and rear sides of the processors 804. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
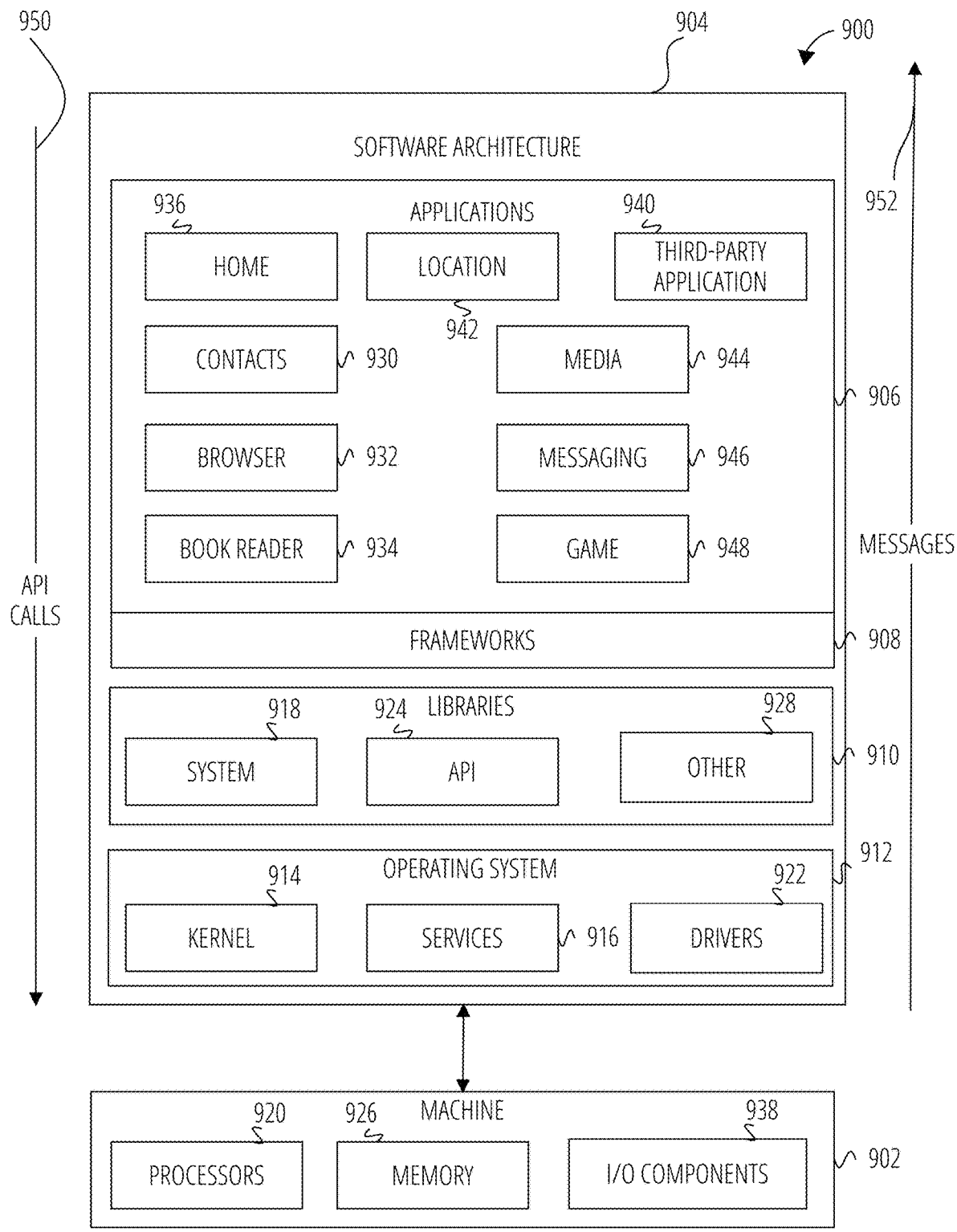
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
receiving plural Uniform Resource Locators (URLs), each URL of the plural URLs corresponding to a respective webpage of a website;
accessing, from a database, a set of terms, the set of terms having been predetermined as prioritized;
extracting distinct terms corresponding to a path level, a query key and a cvar key for the plural URLs;
computing a similarity score of the distinct terms with the set of terms;
identifying, based on the computing, URLs of the plural URLs having at least one term appearing within the set of terms;
applying weights to the identified URLs, to prioritize the identified URLs relative to other URLs of the plural URLs;
generating, based on applying the weights, a distance matrix with pairwise distances between the plural URLs;
performing hierarchical clustering based on the distance matrix, to generate a dendrogram in which the plural URLs are arranged in hierarchical clusters;
determining, based on a stored representation of the dendrogram, a predicted page group for each of the plural URLs; and
causing, based on determining the predicted page group for each of the plural URLs, display of metrics corresponding to the website.

2. The method of claim 1, further comprising:
computing URL patterns and conditions for each cluster within the hierarchical clusters.

3. The method of claim 1, wherein the hierarchical clustering comprises agglomerative hierarchical clustering.

4. The method of claim 1, wherein computing the similarity score corresponds to calculating a respective levenshtein ratio for the path level, the query key and the cvar key for the plural URLs, and
wherein the identifying comprises selecting URLs of the plural URLs with levenshtein ratios exceeding a predefined value with respect to the path level, the query key and the cvar key.

5. The method of claim 1, wherein determining the hierarchical clusters comprises:
performing grid searching with respect to a preset range of clusters;
computing a silhouette score for each cluster within the preset range of clusters; and
determining the hierarchical clusters based on the computed silhouette scores.

6. The method of claim 5, further comprising:
accessing, from a database, a set of terms, the set of terms having been predetermined as prioritized,
wherein determining the hierarchical clusters is further based on identifying nodes within the dendrogram having conditions that include at least one term within the set of terms.

7. A system comprising:
a processor; and
a memory storing instructions that, when executed by the processor, configure the processor to perform operations comprising:
receiving plural Uniform Resource Locators (URLs), each URL of the plural URLs corresponding to a respective webpage of a website;
accessing, from a database, a set of terms, the set of terms having been predetermined as prioritized;
extracting distinct terms corresponding to a path level, a query key and a cvar key for the plural URLs;
computing a similarity score of the distinct terms with the set of terms;
identifying, based on the computing, URLs of the plural URLs having at least one term appearing within the set of terms;
applying weights to the identified URLs, to prioritize the identified URLs relative to other URLs of the plural URLs;
generating, based on applying the weights, a distance matrix with pairwise distances between the plural URLs;
performing hierarchical clustering based on the distance matrix, to generate a dendrogram in which the plural URLs are arranged in hierarchical clusters; and
determining, based on a stored representation of the dendrogram, a predicted page group for each of the plural URLs; and
causing, based on determining the predicted page group for each of the plural URLs, display of metrics corresponding to the website.

8. The system of claim 7, the operations further comprising:
computing URL patterns and conditions for each cluster within the hierarchical clusters.

9. The system of claim 7, wherein the hierarchical clustering comprises agglomerative hierarchical clustering.

10. The system of claim 9, wherein computing the similarity score corresponds to calculating a respective levenshtein ratio for the path level, the query key and the cvar key for the plural URLs, and
wherein the identifying comprises selecting URLs of the plural URLs with levenshtein ratios exceeding a predefined value with respect to the path level, the query key and the cvar key.

11. The system of claim 7, wherein determining the hierarchical clusters comprises:
performing grid searching with respect to a preset range of clusters;
computing a silhouette score for each cluster within the preset range of clusters; and
determining the hierarchical clusters based on the computed silhouette scores.

12. The system of claim 11, the operations further comprising:
accessing, from a database, a set of terms, the set of terms having been predetermined as prioritized,
wherein determining the hierarchical clusters is further based on identifying nodes within the dendrogram having conditions that include at least one term within the set of terms.

13. A non-transitory computer-readable storage medium, the computer-readable storage medium including instructions that when executed by a computer, cause the computer to perform operations comprising:
   receiving plural Uniform Resource Locators (URLs), each URL of the plural URLs corresponding to a respective webpage of a website;
   accessing, from a database, a set of terms, the set of terms having been predetermined as prioritized;
   extracting distinct terms corresponding to a path level, a query key and a cvar key for the plural URLs;
   computing a similarity score of the distinct terms with the set of terms;
   identifying, based on the computing, URLs of the plural URLs having at least one term appearing within the set of terms;
   applying weights to the identified URLs, to prioritize the identified URLs relative to other URLs of the plural URLs;
   generating, based on applying the weights, a distance matrix with pairwise distances between the plural URLs;
   performing hierarchical clustering based on the distance matrix, to generate a dendrogram in which the plural URLs are arranged in hierarchical clusters; and
   determining, based on a stored representation of the dendrogram, a predicted page group for each of the plural URLs; and
   causing, based on determining the predicted page group for each of the plural URLs, display of metrics corresponding to the website.

14. The non-transitory computer-readable storage medium of claim 13, the operations further comprising:
   computing URL patterns and conditions for each cluster within the hierarchical clusters.

15. The non-transitory computer-readable storage medium of claim 13, wherein the hierarchical clustering comprises agglomerative hierarchical clustering.

16. The non-transitory computer-readable storage medium of claim 13, wherein computing the similarity score corresponds to calculating a respective levenshtein ratio for the path level, the query key and the cvar key for the plural URLs, and
   wherein the identifying comprises selecting URLs of the plural URLs with levenshtein ratios exceeding a predefined value with respect to the path level, the query key and the cvar key.

17. The non-transitory computer-readable storage medium of claim 13, wherein determining the hierarchical clusters comprises:
   performing grid searching with respect to a preset range of clusters;
   computing a silhouette score for each cluster within the preset range of clusters; and
   determining the hierarchical clusters based on the computed silhouette scores.

* * * * *

UNITED STATES PATENT AND TRADEMARK OFFICE
CERTIFICATE OF CORRECTION

PATENT NO. : 11,841,891 B2
APPLICATION NO. : 17/877691
DATED : December 12, 2023
INVENTOR(S) : Frikha et al.

It is certified that error appears in the above-identified patent and that said Letters Patent is hereby corrected as shown below:

In the Specification

In Column 6, Line 5, delete "118" and insert --124-- therefor

In Column 18, Line 20, after "flagged as", insert --"*";--

In Column 21, Line 37, delete "[{"11_value1":" and insert --[{"l1_value1":-- therefor In Column 21, Line 54, delete "11_value," and insert --l1_value,-- therefor In Column 21, Line 56, delete "13_value1" and insert --l3_value1-- therefor In Column 21, Line 56, delete "13_value2" and insert --l3_value2-- therefor In Column 22, Line 47, delete ""0"" and insert --"Ø"-- therefor In Column 23, Line 3, delete "0=10_value1" and insert --0=l0_value1-- therefor In Column 26, Line 27, delete "I/O" and insert --(I/O)-- therefor In Column 26, Line 49, delete "806," and insert --814,-- therefor Signed and Sealed this
Third Day of December, 2024

Katherine Kelly Vidal
*Director of the United States Patent and Trademark Office*